United States Patent
Sanchez et al.

(10) Patent No.: US 10,789,585 B2
(45) Date of Patent: Sep. 29, 2020

(54) SYSTEMS AND METHODS FOR FACILITATING REMOTE AUTHORIZATION AND PAYMENT OF GOODS VIA MOBILE COMMERCE

(71) Applicant: FIRST DATA CORPORATION, Greenwood Village, CO (US)

(72) Inventors: J. Scott Sanchez, Atlanta, GA (US); Vijay Kumar Royyuru, Norristown, PA (US); Brent Dewayne Adkisson, Omaha, NE (US); Jerome Wendell Myers, Douglasville, GA (US)

(73) Assignee: FIRST DATA CORPORATION, Greenwood Village, CO (US)

( * ) Notice: Subject to any disclaimer, the term of this patent is extended or adjusted under 35 U.S.C. 154(b) by 174 days.

(21) Appl. No.: 14/024,411

(22) Filed: Sep. 11, 2013

(65) Prior Publication Data
US 2014/0081854 A1  Mar. 20, 2014

Related U.S. Application Data

(60) Provisional application No. 61/699,728, filed on Sep. 11, 2012, provisional application No. 61/799,676, filed on Mar. 15, 2013.

(51) Int. Cl.
*G06Q 20/32* (2012.01)
*G06Q 20/40* (2012.01)
(Continued)

(52) U.S. Cl.
CPC ......... *G06Q 20/3223* (2013.01); *G06Q 20/02* (2013.01); *G06Q 20/102* (2013.01); *G06Q 20/204* (2013.01); *G06Q 20/24* (2013.01); *G06Q 20/3224* (2013.01); *G06Q 20/3276* (2013.01); *G06Q 20/3278* (2013.01); *G06Q 20/40* (2013.01); *G06Q 20/4037* (2013.01);
(Continued)

(58) Field of Classification Search
CPC .... G06Q 20/10; G06Q 30/06; G06Q 20/3223; G06Q 20/3276
USPC .......................................................... 705/40
See application file for complete search history.

(56) References Cited

U.S. PATENT DOCUMENTS 7,434,723 B1 * 10/2008 White ............... G06Q 20/32
                                                    235/375
8,065,190 B2 * 11/2011 Collas ............... G06Q 30/0635
                                                    705/26.1

(Continued)

*Primary Examiner* — Christopher Bridges
(74) *Attorney, Agent, or Firm* — Foley & Lardner LLP

(57) ABSTRACT

An on-site consumer at a merchant location can obtain payment authorization and a payment method via a mobile device and mobile application from third-party payor that is not at the merchant location. The on-site consumer can select products for purchase and receive the price from the merchant POS device. The on-site consumer can initial the mobile application and select a third-party payor. A notification can be sent to the mobile or other device of the third-party payor. The third-party payor can elect to pay or decline the request and can select a payment method via the mobile application on their device. The decision of the third-party payor and any payment method can be transmitted to the mobile device of the on-site consumer and/or the merchant POS device. After the completion of the purchase, the mobile application can transmit an electronic receipt to the mobile device of the third-party payor.

18 Claims, 16 Drawing Sheets

(51) Int. Cl.
*G06Q 20/24* (2012.01)
*G06Q 20/42* (2012.01)
*G06Q 30/02* (2012.01)
*G06Q 30/06* (2012.01)
*G06Q 20/10* (2012.01)
*G06Q 20/02* (2012.01)
*G06Q 20/20* (2012.01)
*H04L 29/06* (2006.01)
*G06Q 40/02* (2012.01)
*B60S 3/00* (2006.01)

(52) U.S. Cl.
CPC ......... *G06Q 20/42* (2013.01); *G06Q 30/0222* (2013.01); *G06Q 30/0233* (2013.01); *G06Q 30/0267* (2013.01); *G06Q 30/0625* (2013.01); *G06Q 30/0633* (2013.01); *G06Q 40/025* (2013.01); *H04L 63/083* (2013.01); *B60S 3/00* (2013.01)

(56) References Cited

U.S. PATENT DOCUMENTS

| | | | | |
|---|---|---|---|---|
| 8,145,568 B2* | 3/2012 | Rackley | | G06Q 20/042 235/380 |
| 8,290,876 B1* | 10/2012 | Powell | | G06Q 20/10 705/64 |
| 8,751,316 B1* | 6/2014 | Fletchall | | G06Q 20/322 705/20 |
| 9,276,921 B2* | 3/2016 | Birkler | | G06F 21/313 |
| 9,412,106 B2* | 8/2016 | Laracey | | G06Q 20/1085 |
| 9,646,294 B2* | 5/2017 | Fisher | | H04W 4/21 |
| 2002/0123938 A1* | 9/2002 | Yu | | G06Q 30/0617 705/26.43 |
| 2003/0061111 A1* | 3/2003 | Dutta | | G06Q 30/02 705/26.1 |
| 2003/0229678 A1* | 12/2003 | Wen | | G06Q 20/3224 709/217 |
| 2007/0108269 A1* | 5/2007 | Benco | | G06Q 20/3278 235/380 |
| 2007/0203836 A1* | 8/2007 | Dodin | | G06Q 20/02 705/44 |
| 2008/0140569 A1* | 6/2008 | Handel | | G06Q 30/0601 705/44 |
| 2010/0082445 A1* | 4/2010 | Hodge | | G06Q 20/20 705/21 |
| 2010/0138344 A1* | 6/2010 | Wong | | G06Q 20/10 705/44 |
| 2011/0191209 A1* | 8/2011 | Gould | | G06Q 30/0637 705/26.82 |
| 2012/0006891 A1* | 1/2012 | Zhou | | G06Q 20/3274 235/380 |
| 2012/0136739 A1* | 5/2012 | Chung | | G06Q 30/0601 705/26.1 |
| 2012/0171990 A1* | 7/2012 | Williams | | H04W 4/24 455/406 |
| 2013/0256403 A1* | 10/2013 | MacKinnon | | G06K 5/00 235/375 |

* cited by examiner

SYSTEMS AND METHODS FOR FACILITATING REMOTE AUTHORIZATION AND PAYMENT OF GOODS VIA MOBILE COMMERCE

RELATED APPLICATIONS

This application claims priority to U.S. Ser. No. 61/699,728, titled "Systems and Methods for Implementing Mobile Commerce," filed on Sep. 11, 2012, and to U.S. Ser. No. 61/799,676, titled "Systems and Methods for Implementing Mobile Commerce," filed on Mar. 15, 2013, the entire contents of both of which are hereby incorporated by reference for all purposes.

FIELD OF THE DISCLOSURE

The disclosure generally relates to mobile commerce, and more particularly, to systems and methods for facilitating remote authorization and payment of goods via mobile commerce.

BACKGROUND

In certain situations, a person may want to buy one or more goods and/or services from a merchant at a merchant location and have another person who is not at the merchant location pay for those goods and services. For example, an employee may be making a purchase for their employer. The cost of the purchase may be over the employee's purchase authorization level for the employer or the employee may not have a corporate credit card that is used for company transactions. The employee could get the assistance of another employee to help make the purchase. However, a merchant will typically not accept authorization to charge another employee's corporate or personal credit card over the phone. If another employee who has a high enough purchase authorization level or a corporate credit card is not close enough to the merchant location to come to the merchant location and make the purchase themself, the employee may have to wait until another time to make the purchase for the employer.

Another example is when a child goes to a merchant location to make a purchase of one or more goods and/or services. The child may not have the monetary means to complete the purchase and may seek the assistance of one of their parents. However, if the parent is not nearby, the purchase may not be completed. As with the employer scenario, merchants are typically wary of authorizing payment transactions by third parties who are not located in the merchant's store.

BRIEF DESCRIPTION OF THE DISCLOSURE

The disclosure relates to systems and methods for facilitating remote authorization and payment of goods via mobile commerce.

In one embodiment, a method may be provided. The method may include a user device comprising one or more processors receiving at least one purchase detail for the at least one product or service for purchase. The user device may transmit an alert notification to a device associated with a third-party payor requesting payment of the at least one product or service by the third-party payor. The user device may receive a payment instruction from the device associated with the third-party payor. The user device may display the payment instruction on a display of the user device.

In one aspect of the embodiment, the user device may transmit the payment instruction to a merchant point of sale device for payment of the at least one product or service for purchase.

In one aspect of the embodiment, the at least one purchase detail includes an identification of the at least one item and a price for the at least one item.

In one aspect of the embodiment, the user device may scan a product code for the at least one product or service for purchase, wherein the at least one purchase detail is received in response to the scanning of the product code.

In one aspect of the embodiment, the at least one purchase detail is received from a merchant point of sale device.

In one aspect of the embodiment, the user device may receive a payment code from the device associated with the third-party payor. The user device may also display the payment code on the display of the user device.

In one aspect of the embodiment, the payment code may be selected from the group consisting of a numeric code, an alphanumeric code, a bar code, and a QR code.

In one aspect of the embodiment, the alert notification includes the at least one purchase detail for the at least one product or service for purchase.

In one aspect of the embodiment, the user device determines a listing of payors to request payment of the at least one product or service. The user device displays the listing of payors on the display of the user device. The user device receives a selection of the third-party payor from the listing of payors on the display of the user device.

In one aspect of the embodiment, the user device is located at a merchant location and the third-party payor is located remotely from the merchant location.

In one embodiment, a system may be provided. The system may include at least one memory storing computer-executable instructions and at least one processor, wherein the at least one processor may be configured to access the at least one memory and to execute the computer executable instructions to receive at least one purchase detail for an at least one product or service for purchase; direct communication of an alert notification to a device associated with a third-party payor requesting payment of the at least one product or service by the third-party payor; receive a payment instruction from the device associated with the third-party payor; and display the payment instruction on a display of the user device.

In one aspect of the embodiment, the at least one processor may be further configured to execute the computer-executable instructions to direct communication of the payment instruction to a merchant point of sale device for payment of the at least one product or service for purchase.

In one aspect of the embodiment, the at least one purchase detail includes an identification of the at least one product or service and a price for the at least one product or service.

In one aspect of the embodiment, the at least one processor is further configured to execute the computer-executable instructions to scan a product code for the at least one product or service for purchase, wherein the at least one purchase detail is received in response to the scanning of the product code.

In one aspect of the embodiment, the at least one purchase detail is received from a merchant point of sale device.

In one aspect of the embodiment, the at least one processor is further configured to execute the computer-executable instructions to receive a payment code from the device associated with the third-party payor; and display the payment code on the display of the user device the display of the payment code facilitating payment for the at least one product or service.

In one aspect of the embodiment, the payment code is selected from the group consisting of a numeric code, an alphanumeric code, a bar code, and a QR code.

In one aspect of the embodiment, the alert notification includes the at least one purchase detail for the at least one product or service for purchase.

In one aspect of the embodiment, he at least one processor is further configured to execute the computer-executable instructions to determine a listing of payors to request payment of the at least one product or service; display the listing of payors on the display of the user device; and receive a selection of the third-party payor from the listing of payors on the display of the user device.

In one aspect of the embodiment, the user device is located at a merchant location and wherein the third-party payor is located remotely from the merchant location.

BRIEF DESCRIPTION OF THE DRAWINGS

Reference will now be made to the accompanying drawings, which are not necessarily drawn to scale, and wherein.

DETAILED DESCRIPTION

Figure 1:
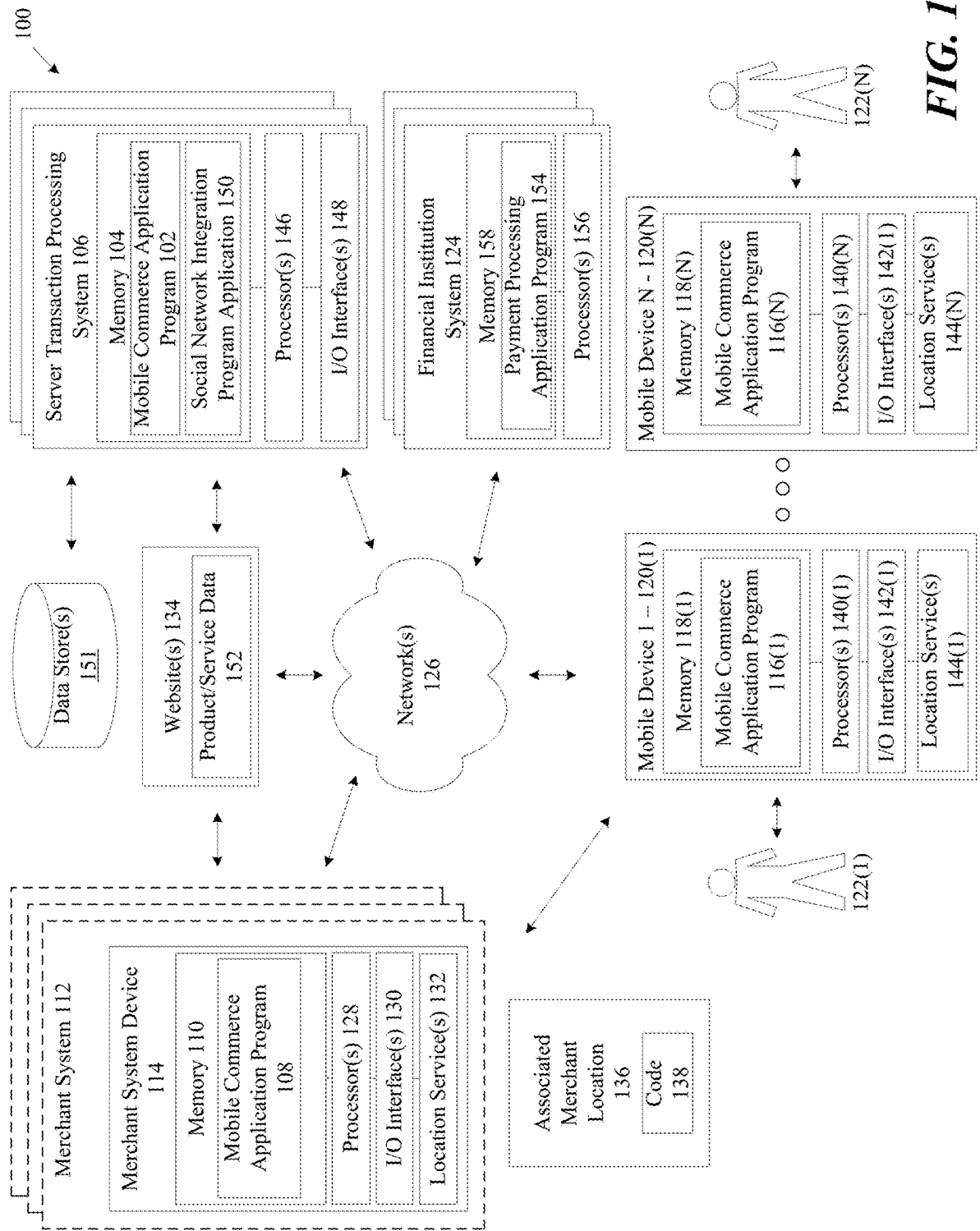
FIG. 1 illustrates an example system for implementing mobile commerce according to certain embodiments of the disclosure.

The present disclosure is directed to systems and methods for facilitating remote authorization and payment of goods via mobile commerce. For example, certain embodiments can facilitate providing an on-site purchaser with the ability to obtain remote authorization and payment of goods at a merchant location by an off-site third-party payor via mobile commerce. Certain example embodiments of the disclosure will now be described more fully hereinafter with accompanying drawings and corresponding description in FIGS. 1-16. This disclosure may, however, be embodied in many different forms and should not be construed as limited to the embodiments set forth herein.

Overview

The present disclosure relates to systems and methods providing an on-site purchaser with the ability to obtain remote authorization and payment of goods at a merchant location by an off-site third-party payor via mobile commerce. In one example implementation, a mobile commerce application program, also known as a mobile wallet or wallet app, can be downloaded or other otherwise implemented by a consumer and/or merchant via a mobile device or client device, such as a smartphone, cellphone, or tablet computer. The mobile commerce application program can integrate payment and communication functionality for use by merchants and consumers to facilitate payment and/or request authorization to pay from an off-site third-party payor.

In one example implementation, an on-site consumer at a merchant location can select one or more goods and/or services for purchase and can present them to the merchant for check-out at a merchant point of sale (POS) device. The on-site consumer can open a mobile commerce application program on the consumer's mobile device. The mobile commerce application program can receive purchase details from the merchant POS device and present third-party payor options to the on-site consumer on the display of the mobile device. The on-site consumer can select a third-party payor on the mobile device and the mobile commerce application program can transmit a notification to the mobile or other device of the selected third-party payor. A mobile commerce application program on the third-party payor's mobile or other device can display the notification and the payment details and can request payment instructions. If the third-party payor approves payment, the mobile commerce application program can present one or more payment options for making payment by the third-party payor. The third-party payor can select one of the payment options on the display of the mobile device and the mobile commerce application program can transmit an approval of the payment and the selected method of payment from the third-party payor's device to the device of the on-site consumer and/or the merchant POS device. If previously sent only to the on-site consumer's mobile device, the mobile commerce application program can transmit the selected payment method from the on-site consumer's mobile device to the merchant POS device. The merchant POS device can then process the purchase of the selected items for the on-site consumer and can transmit an electronic receipt to the device of the third-party payor via the mobile commerce application program.

In another example implementation, an on-site consumer at a merchant location can select an icon on the consumer's mobile device and can launch a mobile commerce application program for multi-consumer remote payments. The on-site consumer can scan one or more bar codes or QR codes for one or more products and/or services at the merchant location. The scanned codes can be transmitted by the mobile commerce application program from the consumer mobile device to the merchant system, such as the merchant POS device, to determine prices for the scanned products and/or services and can receive and display those prices from the merchant system at the consumer mobile device. The mobile commerce application program can generate a listing or optional third-party payors on the display of the consumer mobile device and can receive a selection on the device form the on-site consumer. The mobile commerce application program can transmit a notification to the mobile or other device of the selected third-party payor. A mobile commerce application program on the third-party payor's mobile or other device can display the notification and the payment details and can request payment instructions. If the third-party payor approves payment, the mobile commerce application program can present one or more payment options for making payment by the third-party payor. The third-party payor can select one of the payment options on the display of the mobile device and the mobile commerce application program can generate a payment code associated with the selected payment method by the third-party payor. The payment code can be a numerical code, alphanumerical code, QR code, bar code, or any other one-dimensional or two-dimensional code. The mobile commerce application program can transmit an approval of the payment and the generated payment code from the third-party payor's device to the mobile device of the on-site consumer, where the payment code may be displayed. The merchant may enter or scan the payment code at the merchant POS device to access the third-party payor's payment instructions and selected payment method and may use the selected payment method for payment of the goods and/or services selected by the on-site consumer.

In the above implementations and other embodiments described herein, a mobile commerce application program, sometimes referred to as a wallet app, can be hosted or otherwise stored on a mobile device, client device, server device, or any other processor-based device. Multiple instances of mobile commerce application programs can operate within a network environment, such as described in FIG. 1, and each may have similar or different functionality, such as described in FIG. 2, according to various example embodiments and implementations as described herein.

Certain Example Implementations and Embodiments

An example architecture or environment for a system 100 according various example embodiments of the disclosure is shown in and described with respect to FIG. 1. A mobile commerce application program or module, such as 102, can be stored in memory 104 at a server device 106. In certain embodiments, a mobile commerce application program or module, such as 108, can be stored in memory 110 at a merchant system computer 112 or associated merchant device 114. In certain embodiments, a mobile commerce application program or module, such as 116(1), can be stored in memory 118(1) at a mobile device 120(1) associated with a consumer 122(1) or user. In any instance, one or more mobile commerce application programs or modules operating on respective computers, servers and/or mobile devices can implement some or all of the functionality described herein.

As shown in FIG. 1, the system 100 may include or otherwise support one or more merchant system computers 112 and/or associated merchant devices 114, one or more consumer or mobile devices 120(1)-120(N), one or more server transaction processing systems 106, and one or more issuer or financial institution systems 124. A wide variety of different types of consumer or mobile devices 120(1)-120(N) may be provided or otherwise supported, such as consumer computers and/or mobile communication devices. As desired, the system 100 may provide or otherwise support a wide variety of other entities associated with payment transactions, such as one or more server transaction processing systems 106. Any number of suitable networks and/or communication channels, such as the illustrated networks 126, may facilitate communication between various components of the system 100.

With reference to FIG. 1, any number of merchant system computers 112 and/or associated merchant devices 114 may be provided or otherwise supported. In certain example embodiments, these merchant system computers 112 and/or associated merchant devices 114 may include one or more point-of-sale (POS) devices or terminals. As desired, each merchant system computer 112 and/or associated merchant device 114 may include any number of processor-driven devices, including but not limited to, a server computer, a mainframe computer, one or more networked computers, a desktop computer, a personal computer, a laptop computer, a mobile computer, a smartphone, a tablet computer, a wearable computer device, an application-specific circuit, or any other processor-based device.

A merchant system computer 112 and/or associated merchant device 114 may be any suitable device that facilitates purchase transactions, such as those in retail establishments, e-commerce and/or mobile transactions. In operation, the merchant system computer 112 and/or associated merchant device 114 may utilize one or more processors 128 to execute computer-readable instructions that facilitate the hosting of one or more mobile commerce application program services, the receipt of purchase transaction requests, and/or the processing of payment and/or multi-party remote payment transactions. As a result of executing these computer-readable instructions, a special purpose computer or particular machine may be formed that facilitates the purchase and/or multi-party remote payment transactions.

In addition to having one or more processors 128, the merchant system computer 112 and/or associated merchant device 114 may further include and/or be associated with one or more memory devices 110, input/output ("I/O") interface(s) 130, network interface(s), and/or location services 132. The memory 110 may be any computer-readable medium, coupled to the processor(s) 128, such as random access memory ("RAM"), read-only memory ("ROM"), and/or removable storage devices. The memory 110 may store a wide variety of data files and/or various program modules, such as an operating system ("OS"), one or more host modules, and/or one or more transaction modules or transaction applications, such as mobile commerce application program 108. The data files may include any suitable data that facilitates the operation of the merchant system computer 112 and/or associated merchant device 114, and/or interaction of the merchant system computer 112 and/or associated merchant device 115 with one or more other components (e.g., one or more one or more consumer or mobile devices 120(1)-120(N), one or more server transaction processing systems 106, one or more merchant acquiring platforms, one or more issuer systems, one or more financial institution systems 124, etc.) of the system 100. For example, the data files may include information associated with one or more websites 134 (hosted by either a third-party and/or merchant), webpages, inventory information associated with available products, acquiring platform information, service provider information, information associated with the generation of payment and/or multi-party remote payment transactions and/or routing information for payment and/or multi-party remote payment transactions.

The OS may be any suitable module that facilitates the general operation of the merchant system computer, as well as the execution of other program modules. For example, the OS may be any currently known or future developed operating system including, but not limited to, Microsoft Windows®, Apple OSX™, Unix, a mainframe computer operating system (e.g., IBM z/OS, MVS, OS/390, etc.), or a specially designed operating system. The host modules may include any number of suitable host modules that manage interactions and communications between the merchant system computer 112 and/or associated merchant device 114, and one or more external devices, such as the consumer or mobile devices 120(1)-120(N). For example, the host modules may include one or more Web server modules that facilitate the hosting of merchant websites and/or third-party websites, such as 134, webpages, and/or transaction processing webpages. As another example, the host modules may include one or more cellular modules and/or systems that facilitate cellular communication with one or more mobile devices 120(1)-120(N).

The transaction modules or applications, such as the mobile commerce application program 108, may include any number of suitable software modules and/or applications that facilitate the collection and/or processing of information association with a purchase transaction, such as one or more identifiers of desired products (e.g., UPC identifiers) and/or services, a desired payment account, a desired type of transaction (e.g., a card present transaction, a card not present transaction, etc.), consumer identification information, and/or an identifier of a consumer or mobile device 120(1)-120(N) (e.g., a mobile device identifier, etc.). Based at least in part upon the collected information, the transaction modules or applications may generate and/or communicate a wide variety of transaction-related requests, such as payment processing and/or authorization requests and/or multi-party remote payment requests. One example of the operations that may be performed by a transaction module or mobile commerce application program 108 and/or the merchant system computer 112 and/or associated merchant device 114 is described in greater detail below with reference to FIG. 2.

With continued reference to the merchant system computer 112 and/or associated merchant device 114, the one or more I/O interfaces 130 may facilitate communication between the merchant system computer 112 and/or associated merchant device 114 and one or more input/output devices; for example, one or more user interface devices, such as a display, a keypad, a mouse, a pointing device, a gesture detection device, an eye movement detection device, a control panel, a touch screen display, a remote control, a microphone, a speaker, a consumer device reader, etc., that facilitate user interaction with the merchant system computer 112 and/or associated merchant device 114. The one or more network interfaces may facilitate connection of the merchant system computer 112 and/or associated merchant device 114 to one or more suitable networks, such as 126, and/or communication links. In this regard, the merchant system computer 112 and/or associated merchant device 114 may receive and/or communicate information to other components of the system 100, such as the consumer or mobile devices, for example 120(1)-120(N), the server transaction processing systems 106, and/or the issuer or financial institution systems 124.

In certain example embodiments, a merchant system computer 112 and/or associated merchant device 114 can be associated with a merchant location 136, such as a retail store or "bricks and mortar"-type establishment. The merchant location 136 may include a code 138, such as a QR code, bar code, or other machine readable code, wherein consumers can utilize a respective consumer or mobile device 120(1)-120(N) to scan or read the code to obtain information associated with a merchant, such as a product pricing information.

Additionally, with continued reference to FIG. 1, any number of consumer or mobile devices 120(1)-120(N) may be provided or otherwise supported. Examples of suitable consumer or mobile devices can include, but are not limited to, personal computers and/or mobile communication devices (e.g., mobile phones, smart phones, etc.), etc. According to an example aspect of the disclosure, a consumer or mobile device, such as 120(1) may be a suitable device that is capable of interaction with other components of the system 100 during the request and/or completion of an e-commerce transaction. For example, a personal computer or mobile device may be utilized to access one or more e-commerce websites, such as 134, including those hosted by the merchant system computer, such as 112, identify products and/or services to be purchased, request a purchase and/or multi-party remote payment transaction, and/or interact with the merchant system computer 112, merchant system device 114, and/or other components of the system 100 (e.g., the server transaction processing system 106, etc.) during the completion of a payment and/or multi-party remote payment transaction. In one example embodiment, a mobile device, such as 120(1), may be utilized to request a payment and/or multi-party remote payment transaction and/or to provide validation information during the processing of the payment and/or multi-party remote payment transaction. In another example embodiment, a personal computer may be utilized to request a payment and/or multi-party remote payment transaction, and communication may be established with a mobile device, such as 120(1), in order to facilitate provision of validation information.

As desired, a consumer or mobile device, such as 120(1), may be any number of processor-driven devices, including but not limited to, a personal computer, a mobile computer, an application-specific circuit, a minicomputer, a microcontroller, and/or any other processor-based device. The components of an example mobile device, such as 120(1), will now be described in greater detail, and it will be appreciated that a personal computer may include similar components. With reference to the mobile device 120(1), the mobile device 120(1) may utilize one or more processors 140(1) to execute computer-readable instructions that facilitate the general operation of the mobile device 120(1) (e.g., call functionality, etc.) and/or communication with a merchant system computer 112, merchant system device 114, and/or other components of the system 100 (e.g., the server transaction processing system 106) for payment and/or multi-party remote payment transaction purposes. As a result of executing these computer-readable instructions, a special purpose computer or particular machine may be formed that facilitates the completion of payment and/or multi-party remote payment transactions.

In addition to having one or more processors, the mobile device, such as 120(1)-120(N), may further include and/or be associated with one or more memory devices 118(1)-118(N), input/output ("I/O") interfaces 142(1)-142(N), network interfaces, and/or location services 144(1)-144(N). The memory 118(1)-118(N) may be any computer-readable medium, coupled to the one or more processors 140(1)-140(N), such as random access memory ("RAM"), read-only memory ("ROM"), and/or removable storage devices. The memory 118(1)-118(N) may store a wide variety of data files and/or various program modules, such as an operating system ("OS") and/or one or more transaction modules or applications, such as a mobile commerce application program 116(1)-116(N). In certain example embodiments, a mobile device, such as 120(1), may include one or more secure elements configured to securely store and/or access information, such as payment applications, payment account information, validation information (e.g., a stored mPIN, etc.), encryption information, and/or other transaction-related information. The secure elements may be stored in the memory 118(1) and/or included as a separate component of the mobile device 120(1). For example, a secure element may be a separate chip that is configured to communicate with primary computing functionality for the mobile device. As desired, one or more of the transaction modules, such as the mobile commerce application program 116(1), may be stored on a secure element. The transaction modules may be invoked by other components of the mobile device 120(1) and/or by one or more other components of the system 100, such as the merchant system computer 112, merchant system device 114, and/or the server transaction processing system 106.

The data files may include any suitable data that facilitates the operation of the mobile device, such as 120(1), and/or interaction of the mobile device 120(1) with one or more other components (e.g., a merchant system computer 112, merchant system device 114, a server transaction processing system 106, etc.) of the system 100. For example, the data files may include information associated with accessing the secure elements, information associated with invoking transaction modules, and/or information associated with accessing and/or processing validation data (e.g., an mPIN, etc.). The OS may be a suitable module that facilitates the general operation of the mobile device, such as 120(1), as well as the execution of other program modules. For example, the OS may be any currently known or future developed operating system including, but not limited to, a suitable mobile OS or a specially designed operating system. As desired, the mobile device 120(1) may also include one or more suitable browser applications that facilitate the access of one or more webpages hosted by the merchant system computer 112, and/or third-party or merchant web sites, such as 134.

The transaction modules may include one or more suitable software modules and/or applications configured to facilitate purchase transactions, such as payment and/or multi-party remote payment transactions, on behalf of the mobile device, such as 120(1). In certain embodiments, a transaction module or mobile commerce application program, such as 116(1), may also facilitate communication with a server transaction processing system, such as 106, or a trusted service manager. A wide variety of suitable techniques may be utilized to install a transaction module on the mobile device, such as 120(1). For example, a transaction module may be provisioned to the mobile device 120(1) by a server transaction processing system 106 and/or by an issuer or financial institution system 124. Additionally, during the installation and/or registration of the transaction module, a wide variety of validation information may be generated and/or identified. For example, a consumer, such as 122(1) may be prompted to enter an mPIN, such as a multi-character and/or multi-numeral code, to an associated mobile device, such as 120(1). As desired, the mPIN may be stored on a secure element. Additionally, the PIN and/or a wide variety of information derived from the mPIN (e.g., an encrypted mPIN, etc.) may be provided to one or more issuer or financial institution systems, such as 124, or an issuer system associated with an issuer of a payment account (e.g., a credit account, a debit account, a stored value account, etc.) that is associated with the transaction module.

According to an aspect of the disclosure, following registration and/or activation of the transaction module, the transaction module may be invoked during a payment and/or multi-party remote payment transaction. For example, the transaction module may be invoked by a merchant system computer 112, merchant system device 114, or by a server transaction processing system 106 at the request of the merchant system computer 112 and/or merchant system device 114. In certain embodiments, the transaction module may be invoked following a consumer request to conduct a payment and/or multi-party remote payment transaction and the identification of the mobile device, such as 120(1), by the merchant system computer 112, merchant system device 114, or server transaction processing system 106. Following the invocation of the transaction module, a request for validation data and/or payment and/or multi-party remote payment account data may be received. As desired, the transaction module may prompt the consumer for entry of an mPIN, and an mPIN value entered by the consumer, such as 122(1), (e.g., by a keypad, touchscreen, etc.) may be identified. A stored mPIN value may then be accessed from the secure element and compared to the entered mPIN value. In this regard, the entered mPIN value may be authenticated. If the entered mPIN value is not authenticated, then the transaction module may reject a proposed transaction and direct the output of a suitable error message.

If, however, the entered mPIN value is authenticated, then the transaction module may provide payment account data or multi-party remote payment account data and associated validation data to the merchant system computer 112, merchant system device 114, or server transaction processing system 106. A wide variety of different types of validation data may be provided as desired in various embodiments, including but not limited to, an mPIN entered by the consumer 122(1), an indication that the entered mPIN was authenticated by the mobile device 120(1) and/or the secure element, an encrypted version of the entered mPIN, and/or an encrypted version of the stored mPIN. In one example embodiment, an entered mPIN may be authenticated, encrypted, and provided to the merchant system computer (or a server transaction processing system). In this regard, the encrypted mPIN may be provided to the issuer or financial institution system, such as 124, for authentication and/or risk analysis purposes.

Examples of the operations of the transaction module and/or the mobile device are described in greater detail below with reference to the other figures.

The one or more I/O interfaces, such as 142(1)-142(N), may facilitate communication between the mobile device, such as 120(1) and one or more input/output devices; for example, one or more user interface devices, such as a display, a keypad, a touch screen display, a microphone, a speaker, etc., that facilitate user interaction with the mobile device 120(1). Further, the one or more network interfaces may facilitate connection of the mobile device, such as 120(1), to one or more suitable networks, for example, the network(s) 126 illustrated in FIG. 1. In this regard, the mobile device, such as 120(1), may receive and/or communicate information to other components of the system 100.

With continued reference to FIG. 1, as desired in various embodiments, any number of server transaction processing systems, such as 106, may be provided or otherwise supported. A server transaction processing system 106 may facilitate the backend processing of a purchase transaction, such as a payment and/or multi-party remote payment transaction. In certain example embodiments, an issuer system may include similar components as those discussed above for the merchant system computer 112 and/or merchant system device 114. For example, server transaction processing system 106 may include any number of processors 146, memories, I/O interfaces 148, and/or network interfaces. In certain example embodiments, a server transaction processing system 106 can include one or more transaction modules, such as a mobile commerce application program 102 and/or a social network integration program application 150. In any instance, the transaction modules can facilitate communications and/or interactions with any number of consumer or mobile devices such as 120(1)-120(N), merchant computer systems such as 112, merchant computer devices 114, data stores 151, third-party websites such as 134, and financial institution systems such as 124. In certain embodiments, a service transaction processing system, such as 106, can host a social network integration program application, such as 150, configured to communicate via any number of social network services and/or websites to obtain information from the services and/or websites, for example, product and/or service data 152 on a third party or merchant website, such as 134.

Furthermore, as desired, a server transaction processing system, such as 106, may provide a wide variety of transaction module provisioning services, such as multi-party remote payment transaction services. Additionally, a server transaction processing system, such as 106, may provide a wide variety of transaction-related and/or value added services ("VAS") in association with transactions, such as coupon redemption services, loyalty/reward services, location-based services, electronic receipt services, product registration services, warranty services, coupon issuance services, and/or the routing of a proposed transaction to an issuer for approval and/or settlement purposes. In certain example embodiments, a server transaction processing system, such as 106, may include similar components as those discussed above for the merchant system computer, such as 112, and/or merchant system device, such as 114. For example, a server transaction processing system, such as 106, may include any number of processors, memories, I/O interfaces, and/or network interfaces.

With continued reference to FIG. 1, as desired in various example embodiments, any number of issuer or financial institution systems, such as 124, may be provided or otherwise supported. An issuer or financial institution system, such as 124, may facilitate the backend processing of a payment and/or multi-party remote payment transaction, such as a payment for one or more products selected by an on-site consumer at a merchant location but paid for by an off-site third-party payor. For example, an issuer or financial institution system, such as 124, may host a payment processing application program, such as 154, or module to facilitate the approval, authentication, and/or settlement of a payment transaction, such as a multi-party remote payment transaction. In certain example embodiments, a payment transaction, such as a multi-party remote payment transaction, may be routed to an issuer or financial institution system, such as 124, via a suitable transaction network (e.g., a debit network, a credit network, etc.), and the issuer or financial institution system, such as 124, may evaluate the payment transaction via the payment processing application program, such as 154, or module. An approval or rejection of the payment transaction may then be output for communication to a merchant system computer, such as 112, and/or merchant system device 114. The issuer or financial institution system, such as 124, may then facilitate the settlement of the payment transaction. In certain embodiments, an issuer or financial institution system, such as 124, may include similar components as those discussed above for the merchant system computer 112 and/or merchant system device 114. For example, an issuer or financial institution system, such as 124, may include any number of processors 156, memories 158, I/O interfaces 160, and/or network interfaces.

In certain example embodiments of the disclosure, an issuer or financial institution system, such as 124, may receive validation information in association with a purchase and/or multi-party remote payment transaction.

A wide variety of suitable networks, individually and/or collectively shown as 126 in FIG. 1, may be utilized in association with embodiments of the disclosure. Certain networks may facilitate use of a wide variety of e-commerce-related communication. For example, one or more telecommunication networks, cellular networks, wide area networks (e.g., the Internet), and/or other networks may be provided or otherwise supported. Other networks may facilitate communication of transaction-related communications. For example, one or more transaction networks, such as branded networks (e.g., a VISA network, etc.), debit and/or PIN networks, and/or a wide variety of other suitable transaction networks may facilitate communication of transaction-related communications, such as e-commerce transactions. Due to network connectivity, various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the disclosure should not be construed as being limited to any particular operating environment, system architecture, or device configuration.

Figure 2:
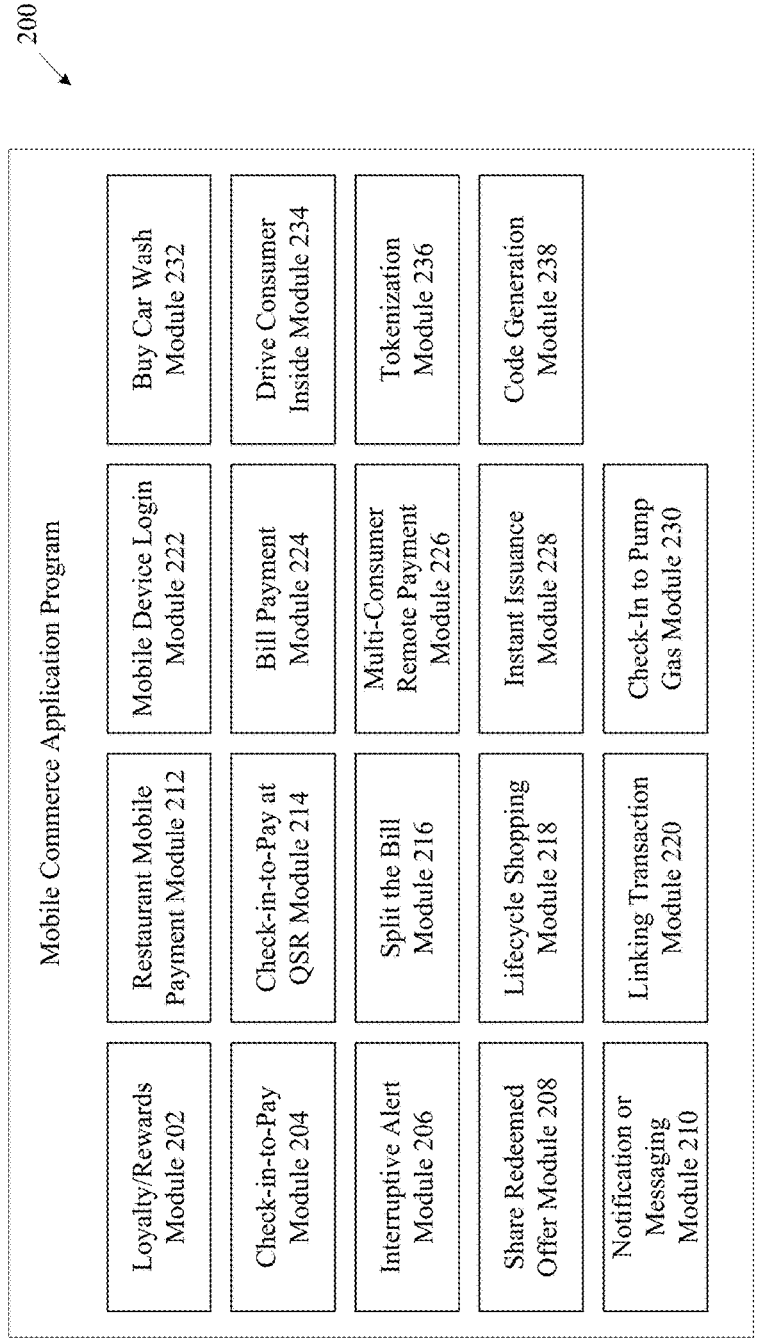
FIG. 2 illustrates an example mobile commerce program application or module according to certain embodiments of the disclosure.

FIG. 2 shows an example mobile commerce application program 200, similar to the mobile commerce application programs 102, 108, and 116(1)-116(N) in FIG. 1, that can operate with respect to the system 100 shown in FIG. 1. The mobile commerce application program 200 shown in FIG. 2 can include, for example, a loyalty/rewards module 202, a check-in-to-pay module 204, an interruptive alert module 206, a share redeemed offer module 208, a notification or messaging module 210, a restaurant mobile payment module 212, a check-in-to-pay at QSR module 214, a split the bill module 216, a lifecycle shopping module 218, a linking transaction module 220, a mobile device login module 222, a bill payment module 224, a multi-consumer remote payment module 226, an instant issuance module 228, a check-in to pump gas module 230, a buy car wash module 232, a drive consumer inside module 234, a tokenization module 236, and a code generation module 238. Some or all of the modules 202-238 are described herein with respect to certain mobile commerce functionality, associated processes, and features. FIGS. 3-12 illustrate certain processes associated with some or all of the modules comprising the example mobile commerce application program 200 in FIG. 2. While the various modules 202-238 are shown by way of example, fewer or greater numbers of modules can be present in various embodiments of a mobile commerce application program. Furthermore, various functionality described with respect to one module may be performed by multiple modules in other embodiments of the disclosure.

In some instances, consumers desire to pay bills on behalf of another consumer. In other instances those that have the authority to make purchases, such as site supervisors must stay on location at a worksite and send other workers to pick us the products or services needed from a merchant location. Certain example embodiments of the disclosure can provide systems and methods for or providing an on-site purchaser with the ability to obtain remote authorization and payment of goods at a merchant location by an off-site third-party payor via mobile commerce, such as providing the ability for one consumer to pay for another consumer's purchases using a mobile phone. The methods can be implemented by one or more mobile devices 120(1)-120(N). For example, FIGS. 3-4 illustrate example methods 300-400 for providing an on-site purchaser with the ability to obtain remote authorization and payment of goods at a merchant location by an off-site third-party payor via a consumer mobile device 120.

In one example embodiment, by way of a mobile device or other client device 120, such as a laptop computer or tablet, a consumer at a merchant location can initiate a bill payment feature in a payment application program or app accessible via the consumer's mobile device or other client device 120. For example, in a mobile commerce application program 116 or app accessible via the consumer's mobile device or other client device 120, a set of computer-executable instructions can be configured to receive an indication from the on-site consumer for bill payment decisions to be routed to the consumer via a user interface associated with the consumer's mobile device or other client device 120. In certain embodiments, the set of computer-executable instructions can be configured to receive an accept or decline instruction from the third-party payor's mobile device or other client device 120, and to transmit a suitable payment instruction to a merchant POS device 112 and/or consumer's mobile device or other client device 120 if the payment request is accepted by the third-party payor.

Figure 3:
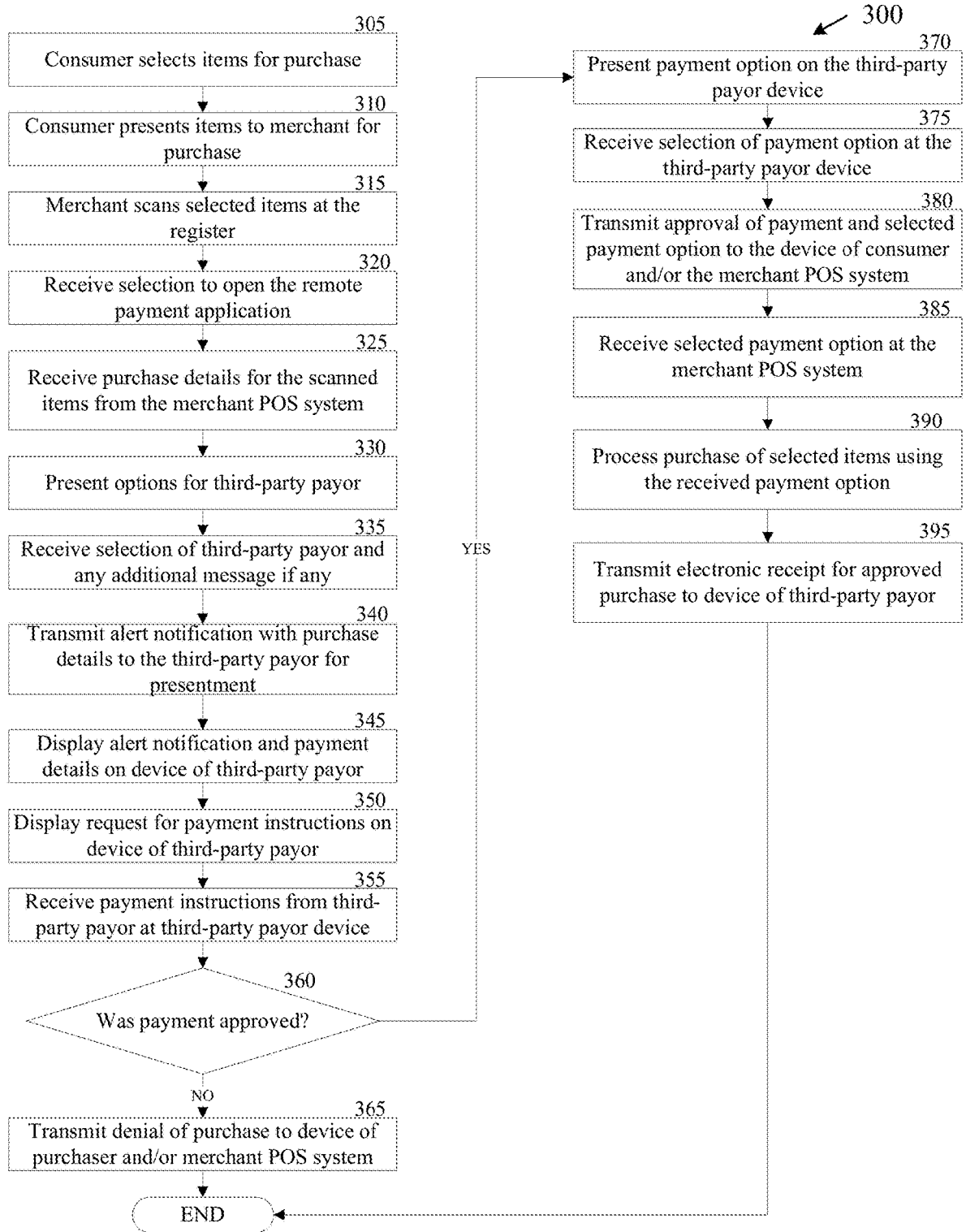
FIG. 3 illustrates an example method for providing an on-site purchaser with the ability to obtain remote authorization and payment of goods at a merchant location by an off-site third-party payor via mobile commerce according to certain example embodiments of the disclosure.
Figure 4:
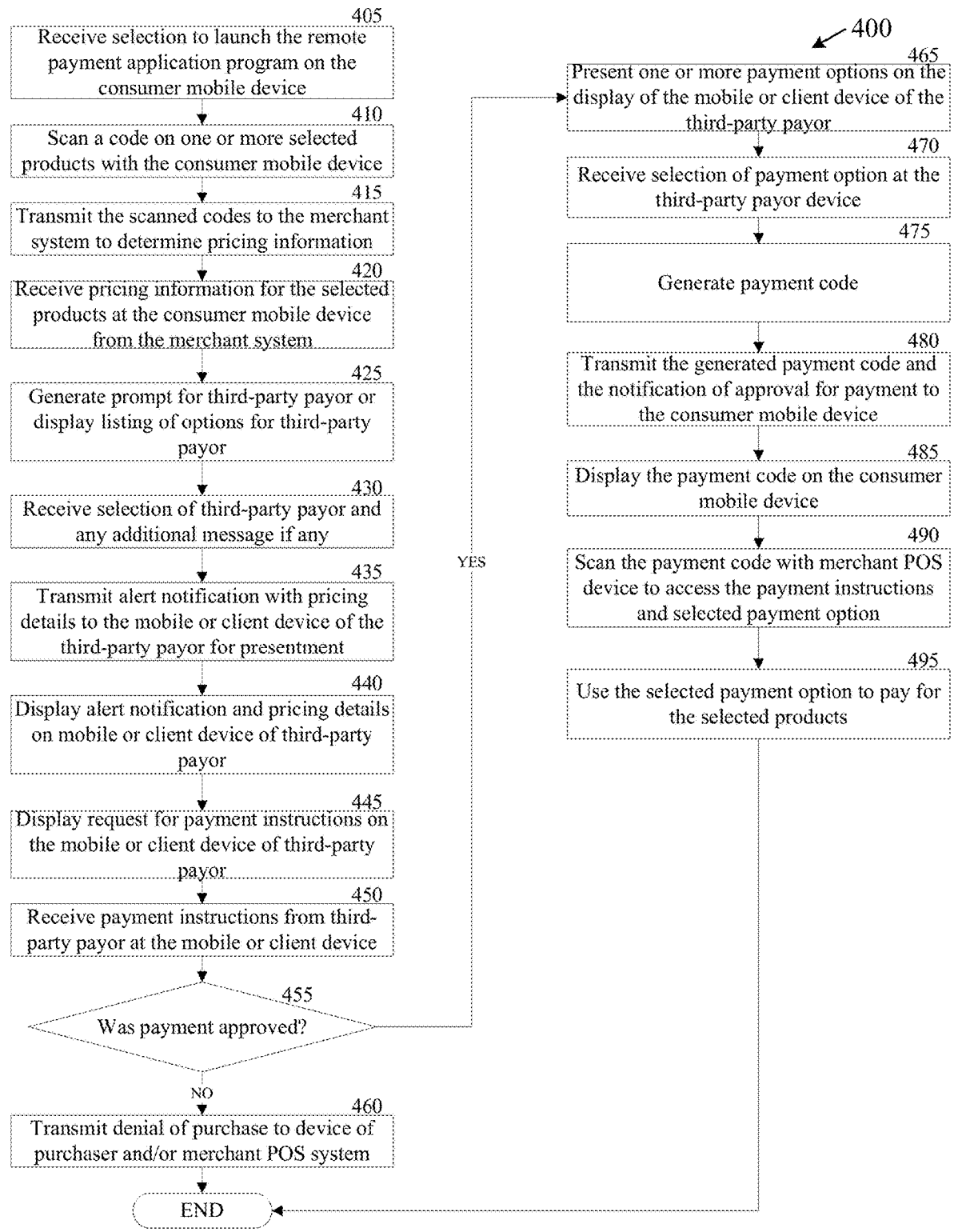
FIG. 4 illustrates another example method for providing an on-site purchaser with the ability to obtain remote authorization and payment of goods at a merchant location by an off-site third-party payor via mobile commerce according to other example embodiments of the disclosure.

FIG. 3 illustrates an example method 300 for providing an on-site purchaser with the ability to obtain remote authorization and payment of goods at a merchant location by an off-site third-party payor via mobile commerce according to certain example embodiments of the disclosure. Various operations of the methods described below can be performed by the system components described above and shown in FIGS. 1 and 2. With reference now to FIGS. 1-3, the example method 300 can begin at block 305, where an on-site consumer at a merchant location selects one or more products and/or services for purchase. For example, a teenager at a store can be shopping and can select a group of items the teenager would like to purchase. In block 310, the on-site consumer presents the items to the merchant for purchase, such as at a merchant POS device 112. In one embodiment, the teenager can take the selected products and/or services to check-out counter, POS device 112, at the merchant location. In block 315, the merchant can scan the selected items at the merchant POS device 112 or register. In one example embodiment, the merchant uses a bar code scanner to scan bar codes attached or otherwise associated with the selected items.

In block 320, a selection can be received at the consumer mobile device 120 to open or launch a mobile commerce application program 116, such as a remote payment application program 116. The remote payment application program 116 can be implemented on a consumer mobile device 120 or other client device, and can launch, for instance, by the consumer, in this case the teenager, manually selecting an icon associated with the multi-consumer remote payment module 226 of the remote payment application program 116 on the touch-enabled display of the consumer mobile device 120. In block 325, the remote payment application program 116 can receive purchase details for the scanned items from the merchant POS device 112. In one example embodiment, the merchant POS device 112 transmits information describing the items scanned, the price of each item scanned, and, optionally, the total price to the remote payment application program 116 at the consumer mobile device 120.

In block 330, the multi-consumer remote payment module 226 retrieves a listing of options for the people who may be the third-party payor. In one example embodiment, this listing can be generated based on information in a contacts module of the consumer mobile device 120. Alternatively, or in addition, the multi-consumer remote payment module 226 can generate one or more prompts or fields where the consumer can insert the name and contact information for the third-party payor. An example of the display of prompts and fields for inserting third-party payor contact information is provided in FIG. 7. In yet another alternative embodiment, the listing of options for the people who may be the third-party payor may be generated based on a predetermined agreement between the on-site consumer and the third-party payor that the third-party payor is willing to be contacted to make payments for the on-site consumer. For example, the on-site consumer may have previously activated the remote payment application program 116 and generated a request to the third-party payor requesting the third-party payor's consent to be contacted by the remote payment application program 116 when the on-site consumer is requesting third-party payment. The third-party payor may then accept or decline the request for consent via the third-party payor's mobile device 120. If the third-party payor declines to consent, the notification of decline can be transmitted from the third-party payor's mobile device 120 to the on-site consumer's mobile device 120. If the third-party payor agrees to consent, the remote payment application program 116 may be automatically or manually downloaded onto the third-party payor's mobile device 120, a notification of agreement can be transmitted from the third-party payor's mobile device 120 to the on-site consumer's mobile device, for example via the remote payment application programs 116 on each device 120 and the contact information for the third-party payor may be stored for access by the remote payment application program 116 on the on-site consumer's mobile device. Pre-registering or previously consenting to be a third-party payor and limiting contact to those you have previously consented to will limit the amount of "spam" requests for third-party payment that may be received by the third-party payor. In this example embodiment, the remote payment application program 116 can search the memory 118 of the device 120 to determine those third-parties that have consented for the particular on-site consumer 122. Alternatively, the list of those that have consented to be third-party payors may be stored in memory 104 of the server transaction processing system 106 and can be accessed by request by the remote payment application program 116 of the on-site consumer's mobile device 120. An example of the display of third-party payor options displayed on the user interface of the on-site consumer's mobile device 120 is provided in FIG. 16.

In block 335, the remote payment application program 116 receives the selection by the on-site consumer of the desired third-party payor. In this example, the third-party payor is the father of the teenager. Alternatively, the third-party payor can be another family member, a co-worker, a friend, or any other person. An example of a display of purchase request on the on-site consumer mobile device 120 ready to be sent to a third-party payor is presented in FIG. 6. In block 340, the multi-consumer remote payment module 226 of the remote payment application program 116 transmits an alert notification and the payment details to a mobile or client device 120 associated with the third-party payor. For example, the alert can be transmitted to the mobile phone 120 of the father via the network 126 and the server transaction processing system 106. A remote payment application program 116 on the third-party payor's mobile device 120 can receive the notification and display the alert notification and payment details on the third-party payor's mobile device 120 in block 345. An example of the display of the notification on the user interface of the third-party payor's mobile device 120 is provided in FIGS. 8 and 9. In block 350, the remote payment application program 116 on the third-party payor's mobile device 120 can generate and display a request for payment instructions. The remote payment application program 116 on the third-party payor's mobile device 120 can receive payment instructions from the third-party payor in block 355.

In block 360, an inquiry is conducted to determine if the payment was approved by the third-party payor, such as the father. If the payment was not approved, the NO branch is followed to block 365, where the remote payment application program 116 of the third-party payor's mobile device 120 transmits a denial of the purchase to the remote payment application program 116 for display on the consumer mobile device 120 and/or to the merchant POS device 112, such as via the server transaction processing system 106 and the network 126. The process continues to the END block.

Returning to the inquiry, if the payment request was approved, the YES branch is followed to block 370, where the remote payment application program 116 for the third-party payor's mobile device 120 retrieves and presents one or more selectable payment method options on the display of the third-party payor's mobile device 120. For instance, the payment options may be those payment options input when the remote payment application program 116 was downloaded to the third-party payor's mobile device 120. Alternatively, the payment method options may have been input by the third-party payor at one time or over a period of time and may be stored in the memory 118 of the third-party payor's mobile device or in the memory 104 of the server transaction processing system 106 and retrieved by the remote payment application program therefrom. Certain examples of displays of the payment options on the user interface of the third-party payor's mobile device 120 is provided at FIGS. 10-12. The remote payment application program 116 receives a selection by the third-party payor of the desired payment method at the display of the third-party payor's mobile device 120 in block 375.

In block 380, the remote payment application program 116 of the third-party payor's mobile device 120 can transmit, via the network 126 and/or the server transaction processing system 106 approval information and the selected payment method to the remote payment application program 116 of the on-site consumer's mobile device 120 and/or the merchant POS device 112. A notification that the approval information has be sent can be displayed on the user interface of the third-party payor's mobile device 120. An example of that display on the user interface of the third-party payor's mobile device is provided at FIG. 13. The selected payment method is received at the merchant POS device 112 in block 385. For instance the selected payment method may be sent to the merchant POS device 112 from the third-party payor's mobile device 120 or other client device via the on-site consumer's mobile device 120, the server transaction processing system 106 and/or the network 126. In another embodiment, the selected payment method is sent to the on-site consumer's mobile device 120 and transmitted to the merchant POS device 112 via a location service 144, 132 on the on-site consumer's mobile device 120 and communicably coupled to the POS device 112. In one example embodiment, the location service can be near-field communication. In yet another example embodiment, the selected payment method is sent to the on-site consumer's mobile device 120 and displayed such that the teenager, for example, can show the display to the merchant, who can key in the payment option information for payment. One example of the display on the user interface of the on-site consumer's mobile device 120 for a notification of approval or decline by the third-party is provided in FIGS. 14 and 15.

In block 390, the merchant POS device 112 or other third-party payment processor 124 may process the purchase of the selected items by the teenager using the selected and received payment method. In block 395, the remote payment application program 116, 108, or 102 and/or the multi-consumer remote payment module 226 included as part of the remote payment application program 116, 108, or 102 can generate and/or transmit an electronic receipt for the approved purchase to the mobile device 120 of the third-party payor, such as the father. The process then continues to the END block.

FIG. 4 illustrates another example method 400 for providing an on-site purchaser with the ability to obtain remote authorization and payment of goods at a merchant location by an off-site third-party payor via mobile commerce according to other example embodiments of the disclosure. The example method 400 will be described with reference to a consumer who is worker and a third-party payor who is a supervisor but this is for example only and is not intended to be limited to such an on-site consumer/third-party payor arrangement. Various operations of the methods described below can be performed by the system components described above and shown in FIGS. 1 and 2. With reference now to FIGS. 1, 2, and 4, the example method 400 begins at block 405, where a selection can be received at the on-site consumer mobile device 120 to open or launch the remote payment application program 116. The remote payment application program 116 can be implemented on the on-site consumer mobile device 120 or other client device, and can launch, for instance, by the consumer, in this case the worker, manually selecting an icon associated with the multi-consumer remote payment module 226 of the remote payment application program 116 on the touch-enabled display of the on-site consumer's mobile device 120.

Figure 5:
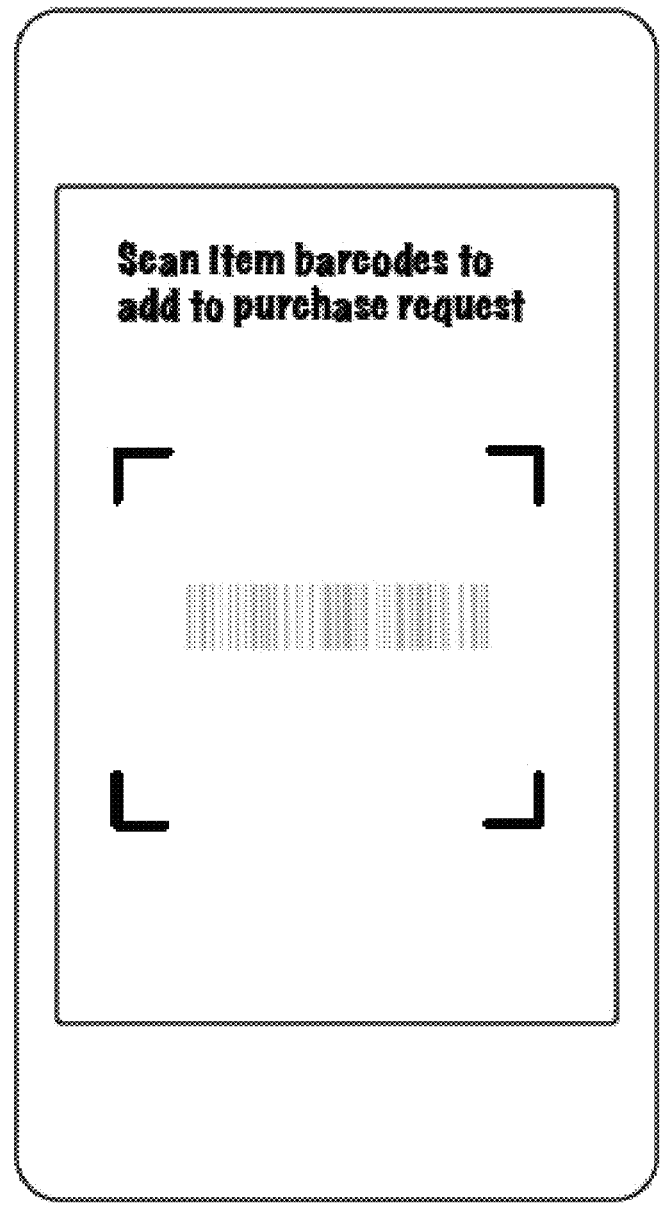
FIGS. 5-16 illustrate example screenshots presented on a consumer mobile device to facilitate providing an on-site purchaser with the ability to obtain remote authorization and payment of goods at a merchant location by an off-site third-party payor according to certain example embodiments of the disclosure.
Figure 6:
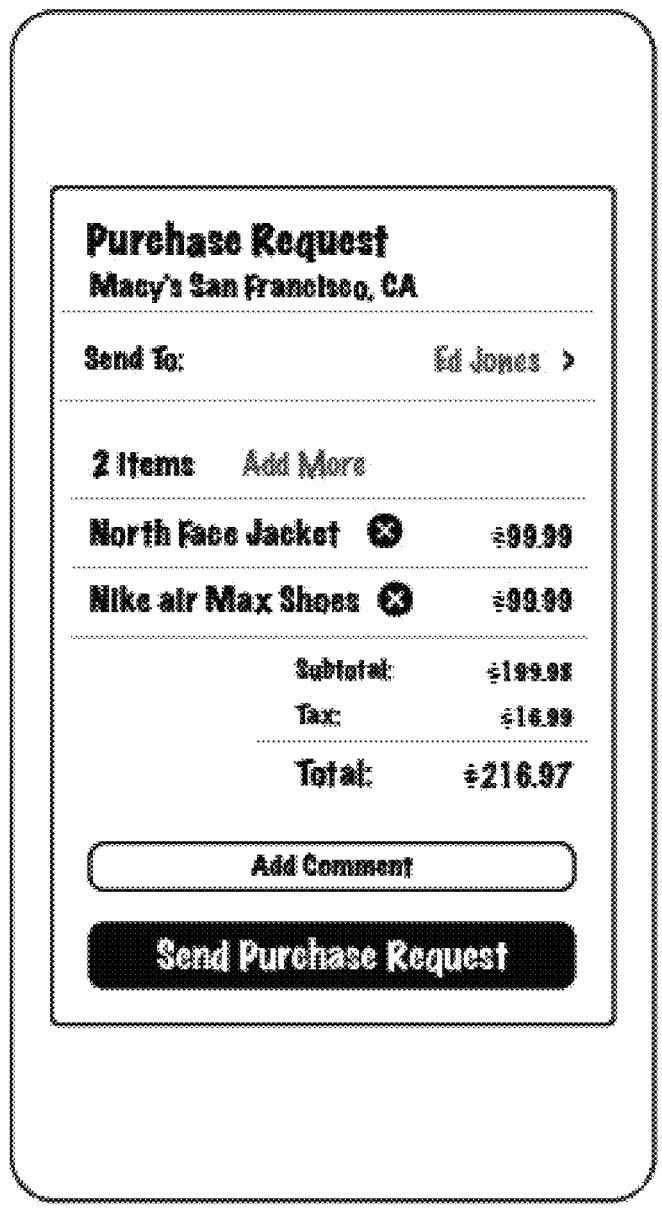
Figure 7:
Figure 8:
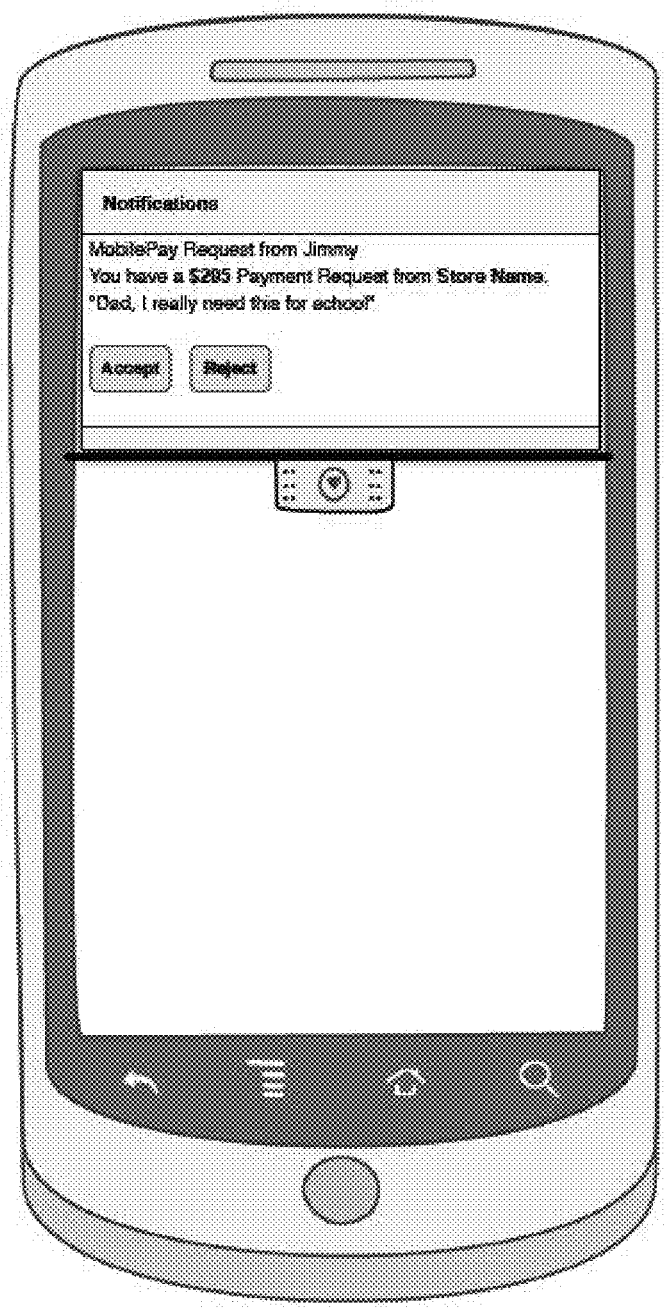
Figure 9:
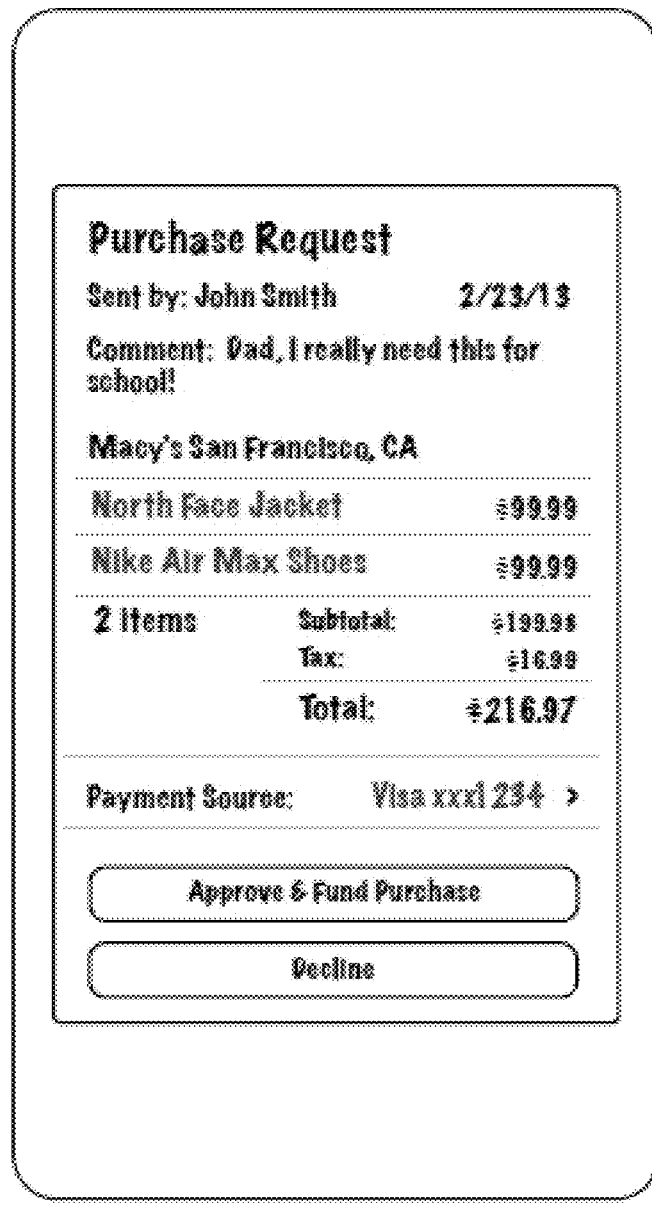
Figure 10:
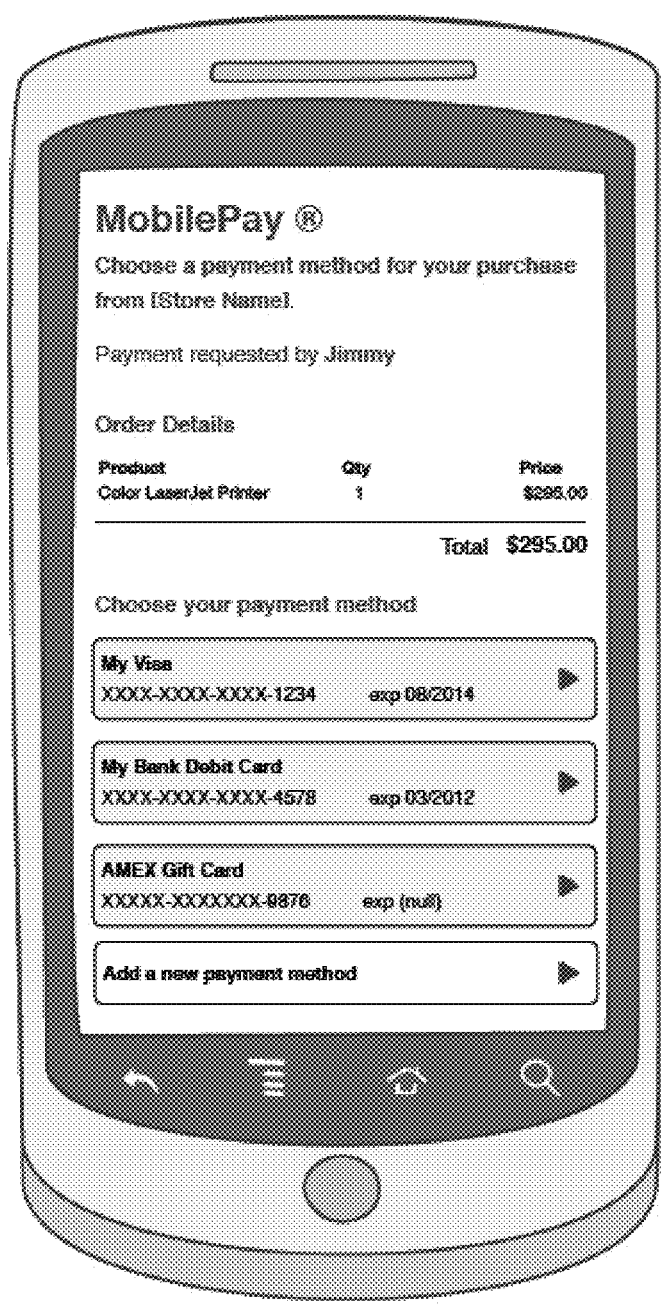
Figure 11:
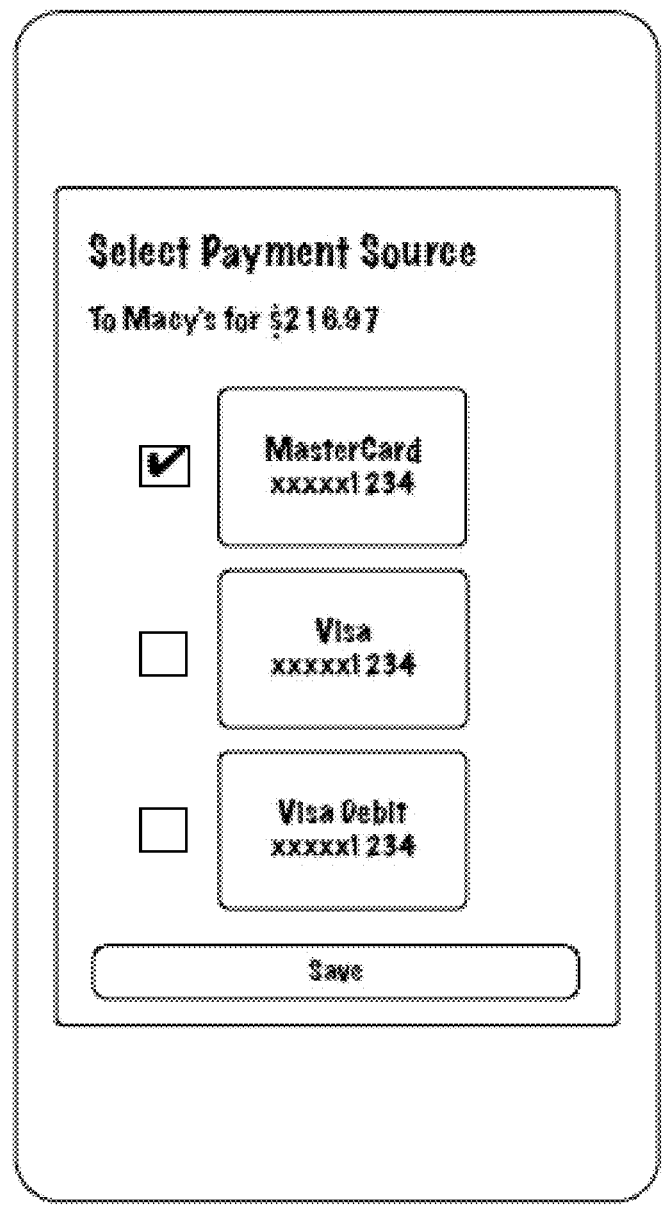
Figure 12:
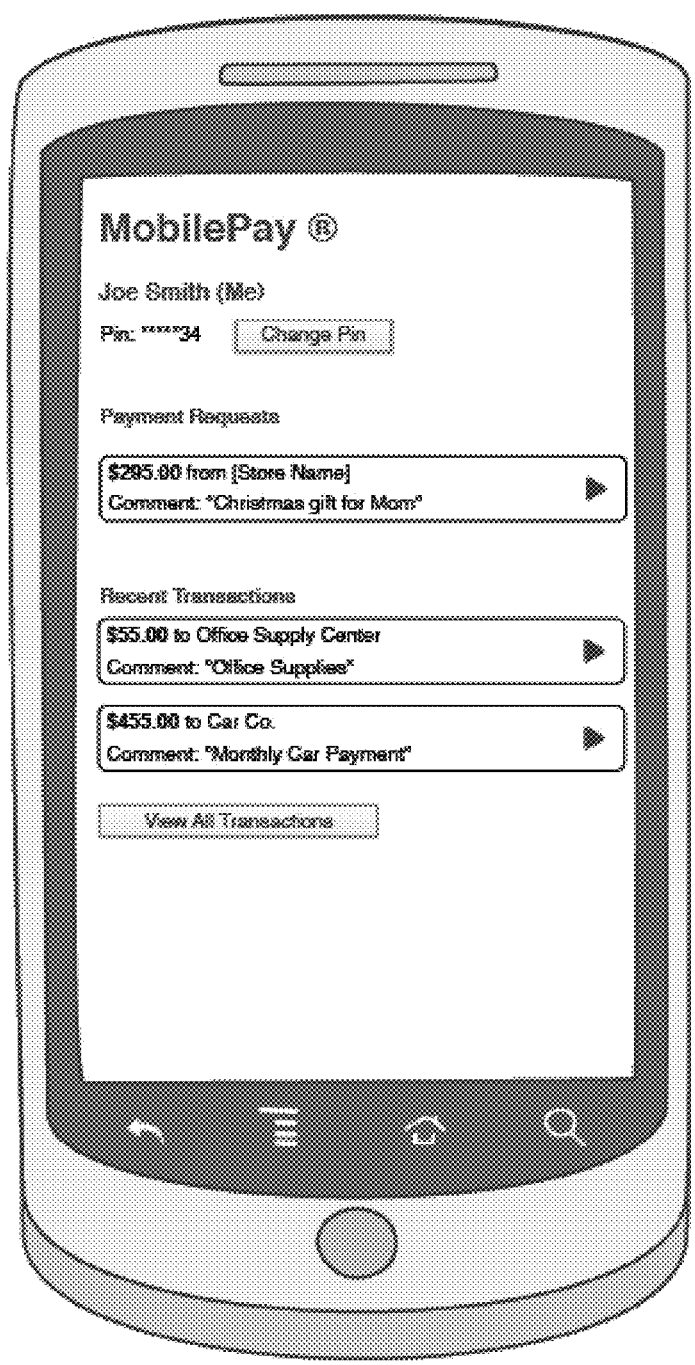
Figure 13:
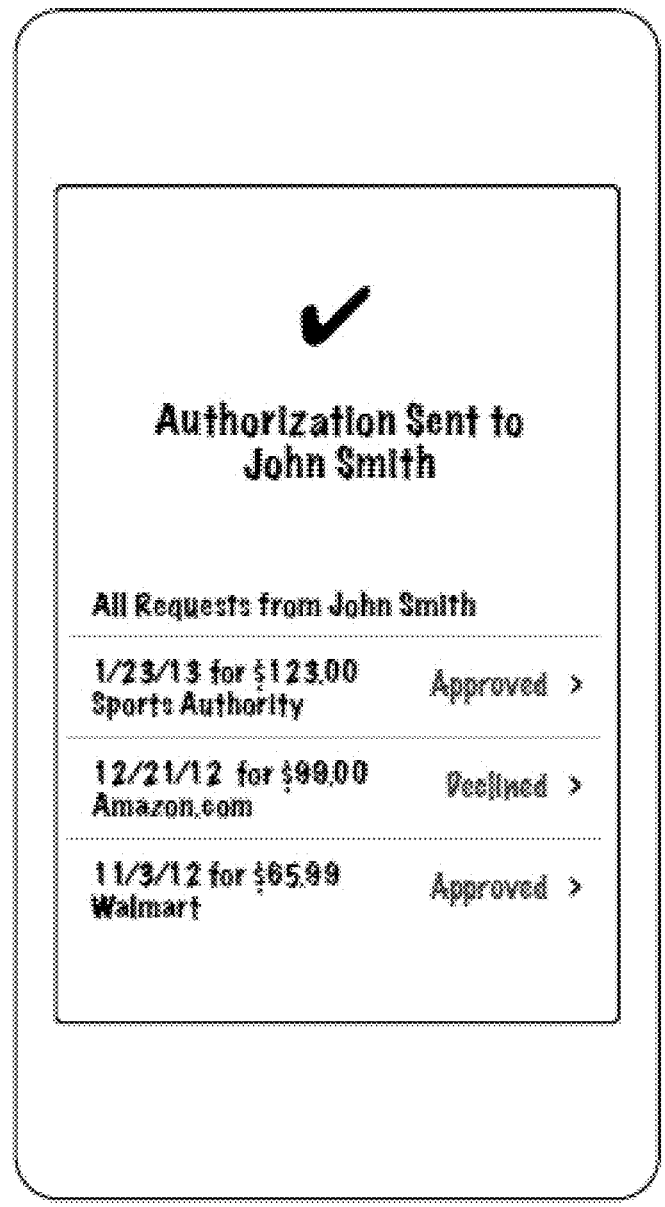
Figure 14:
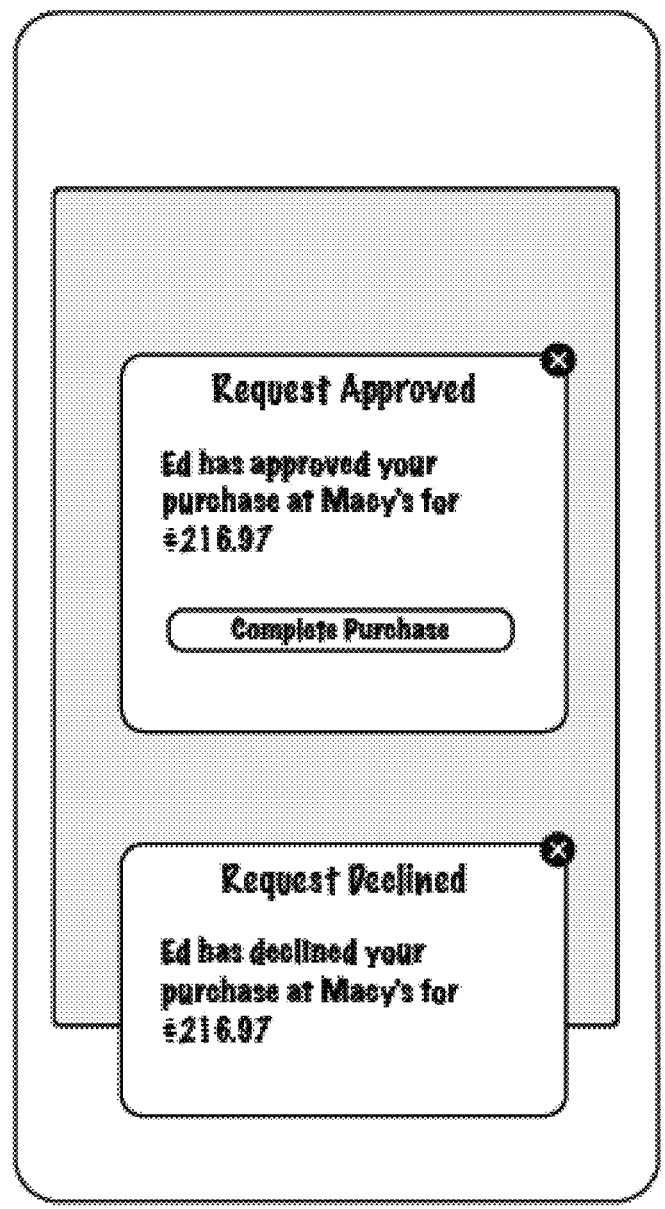
Figure 15:
Figure 16:
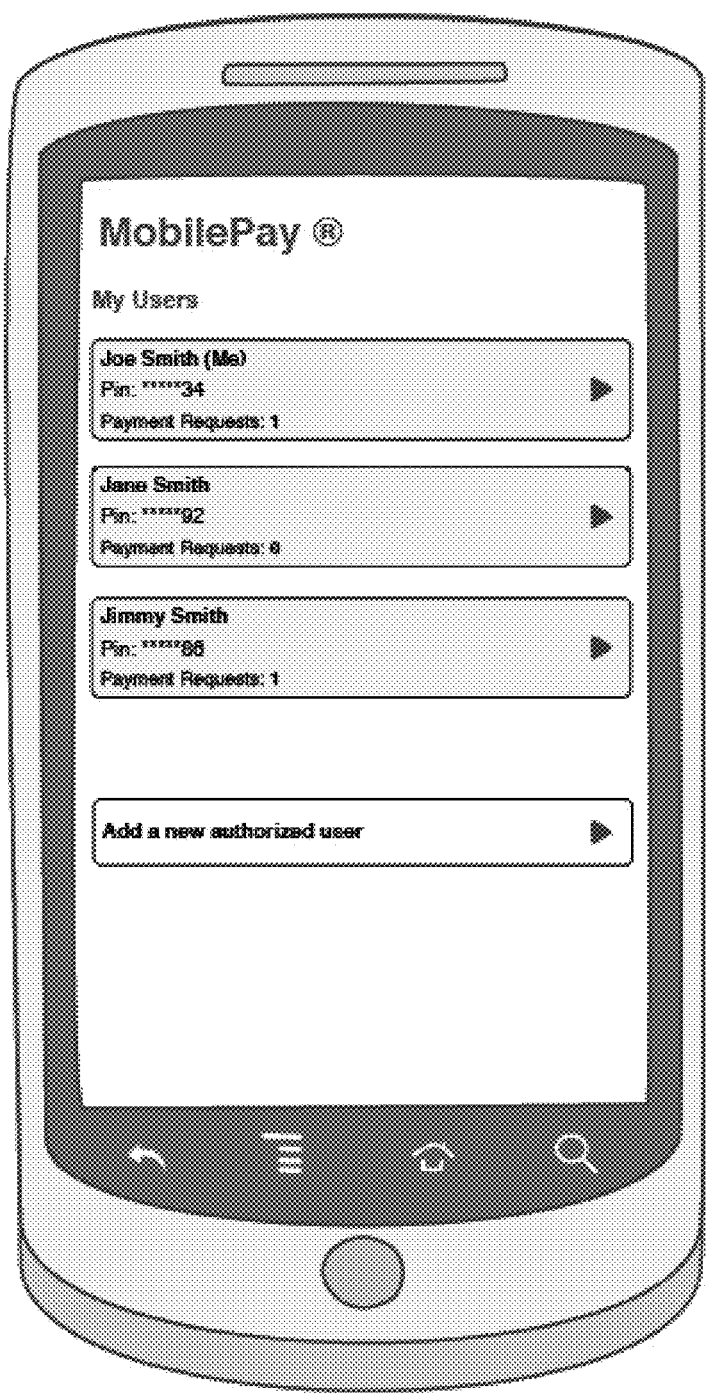

In block 410, the worker can use his mobile device 120 to scan a code on one or more products that the worker intends to select for purchase. In one example embodiment, the code is a bar code, a QR code, or any other one-dimensional or two dimensional code and is scanned using the camera, bar code reader, or QR code reader incorporated into the on-site consumer mobile device 120. An example of a display of a scanned bar code at the on-site consumer mobile device is shown in FIG. 5. The remote payment application program 116 transmits the scanned codes to the merchant system 112 to determine pricing information for the selected products in block 415. For example, the remote payment application program 116 of the on-site consumer's mobile device 120 can transmit the codes via the network 126 and/or the server transaction processing system 106 to remote payment application program 108 of the merchant system or POS device 112. The pricing information for the selected products is received by the multi-consumer remote payment module 226 of the remote payment application program 116 of the on-site consumer's mobile device 120 in block 420. For example, the remote payment application program 108 can retrieve the pricing information from the memory 114 of the merchant system 112 and can transmit the pricing information via the network 126 and/or the remote payment application program 102 of the server transaction processing system 106 to the remote payment application program 116 of the on-site consumer's mobile device 120.

In block 425, the multi-consumer remote payment module 226 retrieves a listing of options for the person who will be the third-party payor. In one example embodiment, this listing can be generated based on information in a contacts module of the on-site consumer's mobile device 120. Alternatively, or in addition, the multi-consumer remote payment module 226 can generate one or more prompts or fields where the on-site consumer (e.g., the worker) can insert the name and contact information for the third-party payor (e.g., the supervisor). In yet another alternative embodiment, the listing of options for the people who may be the third-party payor may be generated based on a predetermined agreement between the on-site consumer and the third-party payor that the third-party payor is willing to be contacted to make payments for the on-site consumer. For example, the on-site consumer may have previously activated the remote payment application program 116 and generated a request to the third-party payor requesting the third-party payor's consent to be contacted by the remote payment application program 116 when the on-site consumer is requesting third-party payment. The third-party payor may then accept or decline the request for consent via the third-party payor's mobile device 120. If the third-party payor declines to consent, the notification of decline can be transmitted from the third-party payor's mobile device 120 to the on-site consumer's mobile device 120. If the third-party payor agrees to consent, the remote payment application program 116 may be automatically or manually downloaded onto the third-party payor's mobile device 120, a notification of agreement can be transmitted from the third-party payor's mobile device 120 to the on-site consumer's mobile device, for example via the remote payment application programs 116 on each device 120 and the contact information for the third-party payor may be stored for access by the remote payment application program 116 on the on-site consumer's mobile device. Pre-registering or previously consenting to be a third-party payor and limiting contact to those you have previously consented to will limit the amount of "spam" requests for third-party payment that may be received by the third-party payor. In this example embodiment, the remote payment application program 116 can search the memory 118 of the device 120 to determine those third-parties that have consented for the particular on-site consumer 122. Alternatively, the list of those that have consented to be third-party payors may be stored in memory 104 of the server transaction processing system 106 and can be accessed by request by the remote payment application program 116 of the on-site consumer's mobile device 120. An example of the display of third-party payor options displayed on the user interface of the on-site consumer's mobile device 120 is provided in FIG. 16.

In block 430, the remote payment application program 116 at the on-site consumer's mobile device 120 receives the selection of the third-party payor (e.g., the supervisor). In addition, fields may be provided whereby the worker can include additional textual information to be provided to the supervisor to explain the purchase and the need for third-party payment. An example presentation of the additional fields on the display of the on-site consumer mobile device 120 is provided in FIG. 7. An example of a display of purchase request on the on-site consumer mobile device 120 ready to be sent to a third-party payor is presented in FIG. 6. In block 435, the multi-consumer remote payment module 226 of the remote payment application program 116 at the on-site consumer's mobile device 120 transmits an alert notification and the pricing details to a mobile or client device 120 associated with the third-party payor. For example, the alert can be transmitted via the network 126 and/or the remote payment application program 102 of the server transaction processing system 106 to the mobile phone 120 of the supervisor and the supervisor's mobile phone 120 can also include a multi-consumer remote payment module 226 as part of a remote payment application program 116. The remote payment application program 116 on the third-party payor's mobile device 120 can receive the notification and display the alert notification and pricing details on the display of the third-party payor's mobile device 120 in block 440. An example of the display of the notification on the user interface of the third-party payor's mobile device 120 is provided in FIGS. 8 and 9. In block 445, the remote payment application program 116 on the third-party payor's mobile device 120 can generate and display a request for payment instructions or can receive the request from the remote payment application program 102 or the remote payment application program 116 on the on-site consumer's mobile device 120. The remote payment application program 116 on the third-party payor's mobile device 120 can receive payment instructions from the third-party payor in block 450.

In block 455, an inquiry is conducted to determine if the payment request was approved by the third-party payor, such as the supervisor. If the payment request was not approved, the NO branch is followed to block 460, where the remote payment application program 116 of the third-party payor's mobile device 120 transmits, via the network 126 and/or the remote payment application program 102 of the server transaction processing system 106, a denial of the purchase to the remote payment application program 116 of the on-site consumer's mobile device 120 and/or the merchant POS device 112. The process continues to the END block.

Returning to the inquiry in block 455, if the payment was approved, the YES branch is followed to block 465, where the remote payment application program 116 for the third-party payor's mobile device 120 presents one or more selectable payment method options on the display of the third-party payor's mobile device 120. For instance, the payment options may be those payment options input when the remote payment application program 116 was downloaded to the third-party payor's mobile device 120. Alternatively, the payment method options may have been input by the third-party payor at one time or over a period of time and may be stored in the memory 118 of the third-party payor's mobile device 120 or in the memory 104 of the server transaction processing system 106 and retrieved by the remote payment application program 116 therefrom. Certain examples of displays of the payment options on the user interface of the third-party payor's mobile device 120 is provided at FIGS. 10-12. The remote payment application program 116 at the third-party payor's mobile device 120 receives a selection of the desired payment method to use in this transaction in block 470.

In block 475, a payment code is generated. In one example embodiment, the payment code is a QR code, bar code, or any other one-dimensional or two-dimensional code. The payment code may be generated by the multi-consumer remote payment module 226 of the remote payment application program 102 or the remote payment application program 116 of the third-party payor's mobile device 120. In block 480, the remote payment application program 116 of the third-party payor's mobile device 120 can transmit, via the network 126 and/or the remote payment application program 102 of the server transaction processing system 106, approval information and the generated payment code to the remote payment application program 116 of the on-site consumer's mobile device 120 and/or the merchant POS device 112. A notification that the approval information has be sent can be displayed on the user interface of the third-party payor's mobile device 120. An example of that display on the user interface of the third-party payor's mobile device is provided at FIG. 13. The payment code is received and displayed at the on-site consumer's mobile device 120 by the multi-consumer remote payment module 226 of the remote payment application program 116 in block 485. One example of the display on the user interface of the on-site consumer's mobile device 120 for a notification of approval or decline by the third-party payor is provided in FIGS. 14 and 15. In addition, an example of the user interface showing one of the example payment codes, in this case a QR code, is provided in FIG. 15. In block 490, the payment code is scanned by the merchant POS device 112 (e.g., a bar code or QR code scanner) to determine the payment instructions and/or selected payment method.

In block 495, the merchant POS device 112 can use the selected payment method to pay for the selected products. For example, the merchant POS device 112 or other third-party payment processor 124 may process the purchase of the selected items by the worker using the selected and received payment method from the third-party payor. In addition, the remote payment application program 102, 108 or 116 and/or the multi-consumer remote payment module 226 included as part of the remote payment application program 102, 108, or 116 can generate and/or transmit an electronic receipt for the approved purchase to the mobile device 120 of the third-party payor, such as the supervisor. The process then continues to the END block.

In certain alternative embodiments, a third-party payor can pre-authorize purchases made by an on-site consumer and set up payment method selections prior to an on-site consumer requesting remote authorization and payment of goods from the third-party payor. Allowing for pre-authorization by the third-party payor can speed up the receipt of authorization and payment instructions at the consumer mobile device 120 of the on-site consumer and can eliminate the need of the remote third-party payor to constantly monitor their mobile device 120 or other device for remote payment requests.

In one alternative embodiment, the third-party payor can launch the mobile commerce application program 116 on the third-party payor's mobile device 120 or another device. Through the use of the multi-consumer remote payment module 224 in the mobile commerce application program 116, the third-party payor can enter one or more pre-authorization parameters. Example pre-authorization parameters may include, but are not limited to, the names of person for whom pre-authorization is provided, exact spending amounts or spending level limits that are pre-authorized, one or more specific merchants from which remote payments are pre-authorized, a time limit or date range for the pre-authorization, and specific products or types of products for which remote payments are pre-authorized. The third-party payor may also combine one or more of these parameters to greater specify the limit of the pre-authorization. The third-party payor can also select a desired payment method (e.g., a credit card, debit card, pre-paid card, gift card, etc.) for use under the pre-authorization. Once the third-party payor has entered the desired parameters of the pre-authorization and selected the desired payment method, the pre-authorization may be stored. For example, the pre-authorization may be stored in memory 118 of the third-party payor's mobile device 120 and may be accessed by the mobile commerce application program 116. Alternatively, the pre-authorization may be transmitted by the mobile commerce application program 106 to one or more of the merchant system 112, the server transaction processing system 106, or the financial institution system 124 via the network 126 for storage and subsequent retrieval at one of those systems.

When an on-site consumer subsequently launches the multi-consumer remote payment module 226 at the consumer's mobile device 120 and selects the third party payor, the multi-consumer remote payment module can generate a request along with the purchase details to one or more of the merchant system 112, the server transaction processing system 106, and the financial institution system 112 to determine if any pre-authorizations have been provided by the third-party payor. If at least one pre-authorization has been provided by the third-party payor, the system in which it is stored can compare the purchase details to the pre-authorization parameters to determine if the purchase details and the on-site consumer satisfy the pre-authorization parameters. If the on-site consumer and/or the purchase details satisfy the pre-authorization parameters, then the payment method stored in the pre-authorization can be selected and transmitted to the consumer mobile device 120 of the on-site consumer along with an approval notification. If, on the other hand, the on-site consumer and/or the purchase details do not satisfy the pre-authorization parameters or no pre-authorization has been stored for the particular third-party payor, then the mobile commerce application program 102, 108, or 116 can transmit an alert notification and the purchase details to the selected third-party payor and the process can proceed in a manner substantially as that described above in FIGS. 3 and 4.

For example, a daughter may tell her father that she needs to go to a store to purchase a new computer. The father may launch the multi-consumer remote payment module 226 on his mobile device and enter certain pre-authorization parameters, such as his daughter's name, the name of the store, any product details or a generic reference to computers or electronics, and the current date. The multi-consumer remote payment module 226 may then generate a display of optional payment methods for selection by the father. The father may select one of the payment methods or input a payment method and can select the pre-authorization to be saved. The pre-authorization can be transmitted by the mobile commerce application program 116 on the father's mobile device 120 to server transaction processing system 106, such as to the mobile commerce application program 102, for storage and use. The daughter goes to the store and selects her new computer. At check-out, the daughter can launch the multi-consumer remote payment module 226 on her mobile device 120 and can select her father as the third-party payor. The multi-consumer remote payment module 226 can generate a request, including the purchase details, and send the request to the mobile commerce application program 102 at the server transaction processing system 106 via the network 106. The mobile commerce application program 102 can determine that a pre-authorization has been stored for the selected third-party payor and can compare the purchase details and the daughter's information to the pre-authorization parameters. If the pre-authorization parameters are satisfied, the mobile commerce application program 102 can retrieve the stored, selected payment method and can transmit the payment method along with an approval to the mobile commerce application program 116 for display on the daughter's mobile device 120. Alternatively, or in addition, the approval and payment method could be transmitted to the merchant system, 112, such as the merchant POS device. Thus, the daughter can receive remote authorization and payment without having to send a notification to the father's mobile device.

Using some or all of the above systems and processes, functionality for providing facilitating bill payments can be enabled. In this manner, consumers can better manage bill payments and can provide relatively quick payment instructions on behalf of another consumer, which can enhance the consumer bill payment and mobile commerce experience.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to example embodiments. It will be understood that one or more blocks of the block diagrams and blocks of the flow diagrams, and combinations of blocks in the block diagrams and blocks of the flow diagrams, respectively, may be implemented by execution of computer-executable program instructions. Likewise, some blocks of the block diagrams and blocks of the flow diagrams may not necessarily need to be performed in the order presented, or may not necessarily need to be performed at all, according to some embodiments. Further, additional components and/or operations beyond those depicted in blocks of the block and/or blocks of the flow diagrams may be present in certain embodiments.

Accordingly, blocks of the block diagrams and blocks of the flow diagrams support combinations of means for performing the specified functions, combinations of elements or blocks for performing the specified functions and program instruction means for performing the specified functions. It will also be understood that each block of the block diagrams and block of the flow diagrams, and combinations of blocks in the block diagrams and blocks of the flow diagrams, may be implemented by special-purpose, hardware-based computer systems that perform the specified functions, elements or steps, or combinations of special-purpose hardware and computer instructions.

The computer-executable program instructions described herein may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A computer program product storing computer-executable instructions that, when executed by at least one processor, configure the at least one processor to perform operations comprising:

transmitting a consent request to be a third-party payor for a user of a user mobile device to at least one client device of at least one third-party payor, wherein each of the at least one third-party payors is one of a family member or co-worker of the user of the user mobile device;

receiving at least one response to the consent request from the at least one client device of at least one third-party payor, wherein the at least one response comprises an acceptance of consent to being a third-party payor for the user of the user mobile device;

receiving a scan of a product code from a merchant location for a product or service for purchase;

transmitting the product code to a merchant point of sale device located at the merchant location;

receiving, from the merchant point of sale device and based at least on the transmission of the product code to the merchant point of sale device, a price for the product or service for purchase;

displaying, based at least on the acceptance of consent received from the at least one client device of the at least one third-party payor, at least one third-party payor for selection on a display of the user mobile device;

receiving a selection of one of the at least one third-party payor;

transmitting an alert notification to a mobile device of the selected third-party payor requesting payment of the product or service by the selected third-party payor;

receiving a payment instruction from the mobile device of the selected third-party payor;

generating, in response to the payment instruction from the mobile device of the selected third-party payor, a two-dimensional payment code comprising one of a QR code and a bar code, the payment code comprising an indication of payment method to pay for the product; and displaying the payment instruction and the payment code simultaneously on a display of the user mobile device.

2. The computer program product of claim 1, further comprising computer-executable instructions that, when executed by the at least one processor, configure the at least one processor to perform operations comprising transmitting the payment instruction to the merchant point of sale device for payment of the product or service for purchase.

3. The computer program product of claim 1, further comprising computer-executable instructions that, when executed by the at least one processor, configure the at least one processor to perform operations comprising receiving, by from the merchant point of sale device and based at least on the transmission of the product code to the merchant point of sale device, an identification of the product or service.

4. The computer program product of claim 1, wherein the alert notification comprises the price for the product or service for purchase.

5. The computer program product of claim 1, further comprising computer-executable instructions that, when executed by the at least one processor, configure the at least one processor to perform operations comprising:
determining based at least on the acceptance of consent received from the at least one client device of the at least one third-party payor, a listing of the at least one third-party payors to request payment of the product or service.

6. The computer program product of claim 1, wherein the selected third-party payor is located remotely from the merchant location.

7. A system for a user mobile device comprising:
at least one memory storing computer-executable instructions; and
at least one processor, wherein the at least one processor is configured to access the at least one memory and to execute the computer-executable instructions to:
direct communication of a consent request to be a third-party payor for a user of a user mobile device to at least one client device of at least one third-party payor, wherein each of the at least one third party payors is one of a family member or co-worker of the user of the user mobile device;
receive at least one response to the consent request from the at least one client device of at least one third-party payor, wherein the at least one response comprises an acceptance of consent to being a third-party payor for the user of the user mobile device;
receive a scan, at a merchant location, of a product code from a merchant location for a product or service for purchase;
direct communication of the product code to a merchant point of sale device located at the merchant location;
receive, from the merchant point of sale device and based at least on the communication of the product code to the merchant point of sale device, a price for the product or service for purchase;
display, based at least on the acceptance of consent received from the at least one client device of the at least on third-party payor, at least one third-party payor for selection;
receive a selection of one of the at least one third-party payor;
direct communication of an alert notification to a mobile device of the selected third-party payor requesting payment of the product or service by the selected third-party payor;
receive a payment instruction from the mobile device of the selected third-party payor;
generate, in response to the payment instruction from the mobile device of the selected third-party payor, a two-dimensional payment code comprising one of a QR code and a bar code, the payment code comprising an indication of a payment method to pay for the product; and
display the payment instruction and the payment code simultaneously on a display of the user mobile device.

8. The system of claim 7, wherein the at least one processor is further configured to execute the computer-executable instructions to direct communication of the payment instruction to the merchant point of sale device for payment of the product or service for purchase.

9. The system of claim 7, wherein the at least one processor is further configured to execute the computer-executable instructions to receive, from the merchant point of sale device and based at least on the communication of the product code to the merchant point of sale device, an identification of the product or service.

10. The system of claim 7, wherein the alert notification comprises the price for the product or service for purchase.

11. The system of claim 7, wherein the at least one processor is further configured to execute the computer-executable instructions to:
determine, based at least on the acceptance of consent received from the at least one client device of the at least one third-party payor, a listing of the at least one third-party payors to request payment of the product or service.

12. The system of claim 7, wherein the user mobile device is located at a merchant location and wherein the selected third-party payor is located remotely from the merchant location.

13. The computer program product of claim 1, wherein the product code is selected from the group consisting of an alphanumeric code, a bar code, and a QR code.

14. The system of claim 7, wherein the product code is selected from the group consisting of an alphanumeric code, a bar code, and a QR code.

15. The computer program product of claim 1, further comprising computer-executable instructions that, when executed by the at least one processor, configure the at least one processor to perform operations comprising generating the consent request.

16. The system of claim 7, wherein the at least one processor is further configured to execute the computer-executable instructions to generate the consent request.

17. The computer program product of claim 1, further comprising computer-executable instructions that, when executed by the at least one processor, configure the at least one processor to perform operations comprising transmitting the payment code to the merchant point of sale device for payment of the product or service for purchase.

18. The system of claim 7, wherein the at least one processor is further configured to execute the computer-executable instructions to direct communication of the payment code to the merchant point of sale device for payment of the product or service for purchase.

* * * * *